United States Patent [19]

Akashi et al.

[11] Patent Number: 5,005,037

[45] Date of Patent: Apr. 2, 1991

[54] AUTO FOCUS ADJUSTING DEVICE

[75] Inventors: Akira Akashi; Terutake Kadohara, both of Yokohama; Ichiro Ohnuki, Kawasaki; Masaki Higashihara, Yokohama, all of Japan

[73] Assignee: Canon Kabushiki Kaisha, Tokyo, Japan

[21] Appl. No.: 528,908

[22] Filed: May 29, 1990

Related U.S. Application Data

[63] Continuation of Ser. No. 272,475, Nov. 17, 1988, abandoned.

[30] Foreign Application Priority Data

Nov. 20, 1987 [JP] Japan .................. 62-293576

[51] Int. Cl.$^5$ .............................. G03B 13/36
[52] U.S. Cl. ...................... 354/400; 354/402
[58] Field of Search ............ 354/400, 402, 406, 407, 354/195.1

[56] References Cited

U.S. PATENT DOCUMENTS 4,705,380 11/1987 Yamamoto et al.
4,709,138 11/1987 Suda et al.
4,762,986 8/1988 Suda et al. ................... 354/402
4,783,677 11/1988 Hamada et al. ............... 354/402
4,816,856 3/1989 Hamada et al. ............... 354/402

FOREIGN PATENT DOCUMENTS

62-125311 6/1987 Japan .
62-139511 6/1987 Japan .
62-139512 6/1987 Japan .

Primary Examiner—Russell E. Adams
Attorney, Agent, or Firm—Fitzpatrick, Cella, Harper & Scinto

[57] ABSTRACT

Apparatus for use with an autofocus adjusting device which has a focus detecting circuit for detecting a focus state of an imaging optical system, and a driving circuit for driving the imaging optical system in accordance with the detected focus has a calculation circuit for performing a first calculation in which imaging plane positions at a plurality of points of time in the past and in the present time are determined on the basis of a signal representing a focusing state in the past and a signal representing a focusing state at the latest time to determine coefficients of a predetermined higher order function. The calculation circuit also performs a second calculation in which an imaging plane position at a time after a predetermined period of time has past is determined on the basis of the higher order function. A regulation circuit regulates the signal representing the focusing state detected by the focus detecting circuit when the second calculation is performed, and causes the second calculation to be performed on the basis of the regulated signal. A control circuit is provided for transmitting the signal representing the imaging plane position obtained by the calculation circuit to the driving circuit for driving the imaging optical system. This allows proper focus point prediction even when the zoom state of a zoom lens changes.

5 Claims, 6 Drawing Sheets

AUTO FOCUS ADJUSTING DEVICE

This application is a continuation of application Ser. No. 272,475 filed Nov. 17, 1988, now abandoned.

BACKGROUND OF THE INVENTION

1. Field of the Invention

This invention relates to an auto focus adjusting device for use in a camera or the like.

2. Background

Many of the auto focus adjusting systems of single-lens reflex cameras intend to focus the lens on an object to be photographed by repetitively effecting the cycles of "focus detection (sensor signal input and focus detection calculation) and lens driving". The amount of lens driving in each cycle is based on the defocus amount at a point of time whereat focus detection is effected in that cycle, and this presumes that the defocus amount during focus detection is eliminated when the lens driving is terminated.

As a matter of course, a considerable time is required for focus detection and lens driving, but in the case of a stationary object to be photographed, the defocus amount does not vary as long as the lens is not driven and therefore, the defocus amount to be eliminated at the point of time whereat lens driving is terminated is equal to the defocus amount at the point of time whereat the focus is detected and thus, correct focus adjustment is accomplished.

However, in the case of an object to be photographed which is rapidly moving, the defocus amount varies during focus detection and lens driving and said defocus amount to be eliminated sometimes differs remarkably from the detected defocus amount and as a result, there arises the problem that the lens is not focused on the object to be photographed when lens driving is terminated.

Auto focus adjusting methods which intend to solve the above-noted problem are disclosed in Japanese Laid-Open Patent Applications Nos. 62-125311, 62-139512 and 62-139511.

The gist of the methods disclosed in the abovementioned patent applications is that in view of the variation in the detected defocus in each said cycle and the time interval between said cycles, the variation in defocus attributable to movement of the object to be photographed is foreseen and correction is exerted on the amount of lens driving, and from the viewpoint of the accuracy of the focus at the end of lens driving, the above-noted problem is expected to be solved by the same methods.

However, if zooming is effected when the auto focus adjusting operation by the above-described correcting method is performed with a zoom lens mounted as a photo-taking lens, there will arise the following problem.

In the above-described correcting method, the variation in defocus attributable to movement of the object to be photographed is foreseen from a plurality of defocus amounts detected in the past, but if zooming is effected, the focal length changes and therefore, the variation in defocus changes even for the same movement of the object to be photographed, and proper correction cannot be accomplished.

Figure 1:
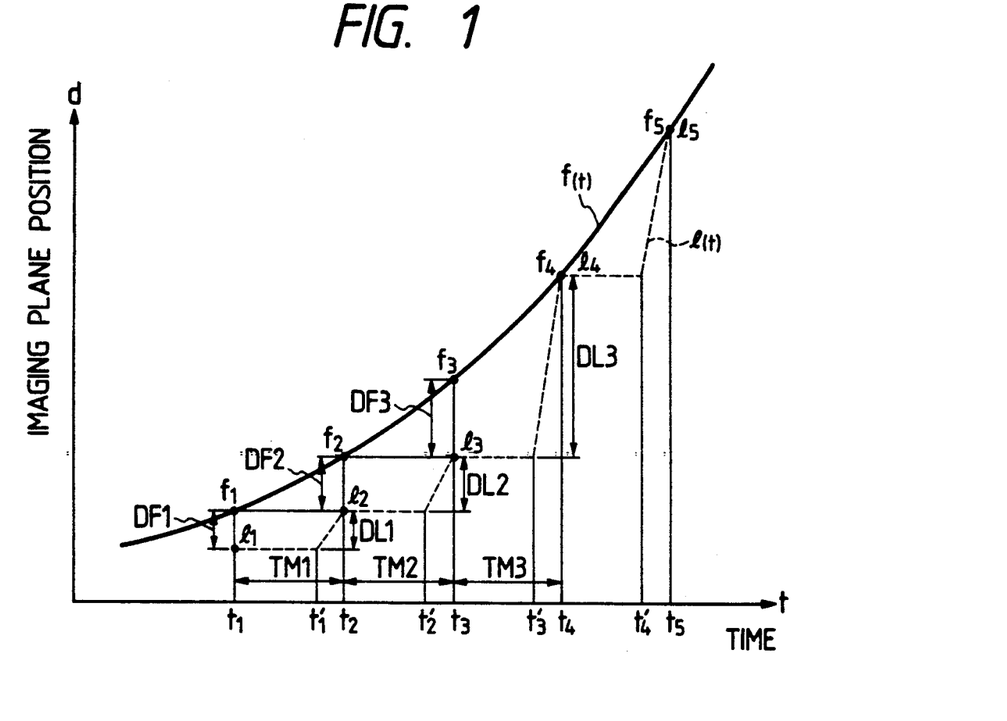
FIGS. 1 and 2 are basic illustrations of an auto focus adjusting method according to the present invention.

FIG. 1 of the accompanying drawings is a graph for illustrating the method of correcting the amount of lens driving shown in the assignee's prior U.S. application filed on Oct. 19, 1988. In this graph, the abscissa represents time t and the ordinate represents the imaging plane position d of the object to be photographed.

The locus f(t) indicated by the solid line means the imaging plane position of the object to be photographed, and the locus l(t) indicated by the broken line means the imaging plane position of the lens.

More particularly, f(t) means the imaging plane position, at time t, of an object to be photographed which approaches the camera in the direction of the optic axis when the focus adjusting optical system of the phototaking lens is at a position for forming the focus at infinity, and l(t) means the imaging plane position of the same object to be photographed at the position of the focus adjusting optical system at time t. The section $[t_1, t_1']$ corresponds to the focus detecting operation, and the section $[t_i', t_{i+1}]$ corresponds to the lens driving operation.

Accordingly, the difference in the direction of the vertical axis d between f(t) and l(t) at the same time t is the so-called defocus amount. $DF_i$ represents the detected defocus amount at time $t_i$, $DL_i$ represents the amount of lens driving as converted into the imaging plane position which has been executed from the result of the focus detection at time $t_{i-1}$, and $TM_i$ represents the time interval between the focus detecting operations.

In the example shown in FIG. 1, it is assumed as a premise for effecting the correcting calculation that the imaging plane position of the object to be photographed varies in accordance with a quadratic function. That is, it is assumed that if the current and past three imaging plane positions $(t_1, f_1)$, $(T_2, f_2)$ and $(t_3, f_3)$ are known at time $t_3$, the imaging plane position $f_4$ at time $t_4$ can be foreseen.

However, what the camera can detect in reality is not the imaging plane positions $f_1$, $F_2$ and $f_3$, but the defocus amounts $DF_1$, $DF_2$ and $DF_3$ and the amounts of lens driving $DL_1$ and $DL_2$ as converted into the amounts of movement of the imaging plane. Time $t_4$ is strictly a future value, and actually is a value which varies with a variation in the accumulation time of an accumulating type sensor caused by the brightness of the object to be photographed, but when determining $f_4$, it is assumed as known in the relation that $t_4 - t_3 = t_3 - t_2$, for simplicity.

Under the above-described assumption, the lens driving as converted into the amount of movement of the imaging plane when lens driving is effected toward $t_4$ at time $t_3'$ from the result of the focus detection at time $t_3$ is found in the following manner.

$$a \cdot t^2 + b \cdot t + c = f(t) \quad (1)$$

$$a \cdot t^2_1 + b \cdot t_1 + c = f(t_1) \quad (2)$$

$$a \cdot t^2_2 + b \cdot t_2 + c = f(t_2) \quad (2')$$

$$a \cdot t^2_3 + b \cdot t_3 + c = f(t_3) \quad (2'')$$

When, in FIG. 1, the point $l_1$ is considered to be the origin, $$f_1 = DF_1 \quad (3)$$

$$f_2 = DF_2 + DL_1 \quad (3')$$

$$f_3 = DF_3 + DL_2 + DL_1 \quad (3'')$$

$$t_1 = 0 \quad (4)$$

$$t_2 = TM, \quad (4')$$

$$t_3 = TM_1 + TM_2 \quad (4'')$$

If equations (3), (3'), (3''), (4), (4') and (4'') are substituted into equations (2), (2') and (2'') to find said a, b and c, $$a = \frac{DF_3 + DL_2 - DF_2}{(TM_1 + TM_2) \cdot TM_2} + \frac{DF_1 - DL_1 - DF_2}{(TM_1 + TM_2) \cdot TM_1} \quad (5)$$

$$b = \frac{DF_2 + DL_1 - DF_1 - a \cdot TM_1^2}{TM_1} \quad (6)$$

$$c = DF_1 \quad (7)$$

Consequently, the amount of lens driving $DL_3$ as converted into the amount of movement of the imaging plane at time $t_4$ is:

$$\begin{aligned}
DL_3 &= f_4 - l_3 \quad (8)\\
&= f_4 - (f_3 - DF_3)\\
&= a \cdot (TM_1 + TM_2 + TM_3)^2 +\\
&\quad b \cdot (TM_1 + TM_2 + TM_3) + C -\\
&\quad \{a \cdot (TM_1 + TM_2)^2 - b \cdot (TM_1 + TM_2) + c\} + DF_3\\
&= a\{(TM_1 + TM_2 + TM_3)^2 - (TM_1 + TM_2)^2\} -\\
&\quad b \cdot TM_3 + DF_3
\end{aligned}$$

Here, on the assumption that as previously described, $TM_3$ is known in the relation that $TM_3 = TM_2$, $DL_3$ is found from equation (8). The amount of lens driving at $t_n$ after time $t_4$ can likewise be found from the past three detected defocus amounts $DF_{n-2}$, $DF_n$ and $DF_n$, the past two actual amounts of lens driving $DL_{n-2}$ and $DL_{n-1}$ and the past two time intervals $TM_{n-2}$ and $TM_{n-1}$.

$$a_n = \quad (9)$$

$$\frac{DF_n + DL_{n-1} - DF_{n-1}}{(TM_{n-2} + TM_{n-1})TM_{n-1}} + \frac{DF_{n-2} - DL_{n-2} - DF_{n-1}}{(TM_{n-2} + TM_{n-1})TM_{n-2}}$$

$$b_n = \frac{DF_{n-1} + DF_{n-2} - DF_{n-2} - a \cdot TM_{n-2}^2}{TM_{n-2}} \quad (10)$$

$$DL_n = a_n \{(TM_{n-2} + TM_{n-1} + TM_n)^2 - \quad (11)$$

$$(TM_{n-2} + TM_{n-1})^2\} + b_n \cdot TM_n + DF_n$$

If in accordance with equations (9), (10) and (11), the defocus amount $DL_n$ for effecting lens driving is found from the detected defocus amount $DF_n$ and lens driving is effected, proper focusing will always become possible at the end of lens driving.

In the above-described correcting method, the imaging plane position is extrapolated by a quadratic function and therefore, the data of the past two focus detecting operations are necessary However, data is deficient at the first two times after focus adjustment is started and therefore, as shown in FIG. 1, in the first two focus adjusting operations, the lens is driven on the basis of the detected defocus amount itself Accordingly, the actual correcting calculation is effected from the third lens driving on, and as expressed in FIG. 1, the effect of correction presents itself from time $t_4$ on.

Figure 2:
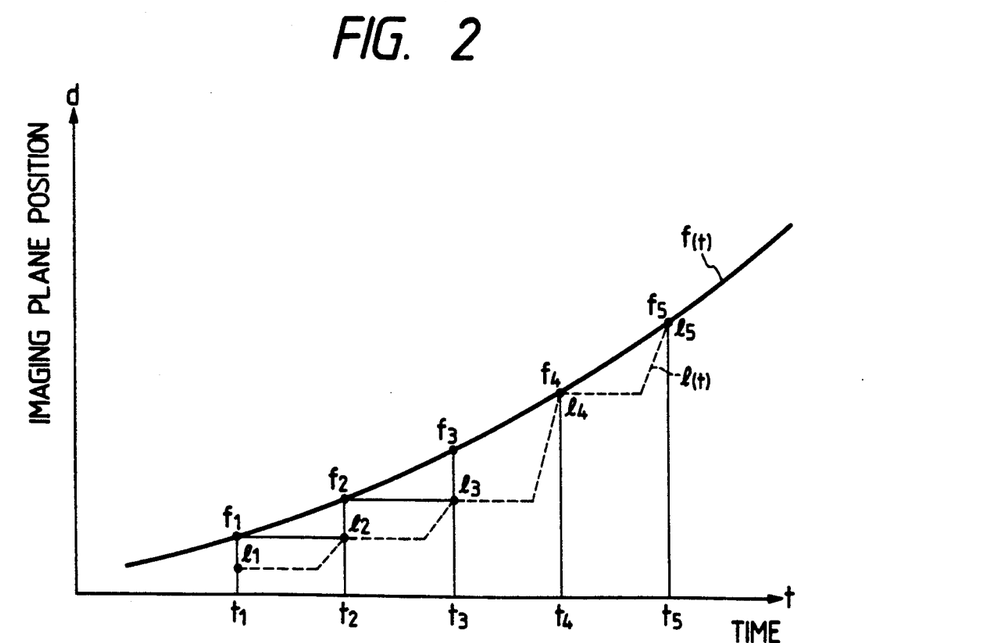

Now, the change in the imaging plane position shown in FIG. 1 is that in the case of a particular focal length, and even for the same movement of the object to be photographed, the aspect of the change in the imaging plane position will change if the focal length of the photo-taking lens changes. Assuming that FIG. 1 is the case of the relatively telephoto side of a zoom lens, the movement of the imaging plane position on the wide angle side is as shown in FIG. 2 of the accompanying drawings. Even for the same movement of the object to be photographed, the variation in defocus becomes smaller on the wide angle side than on the telephoto side.

Figure 3:
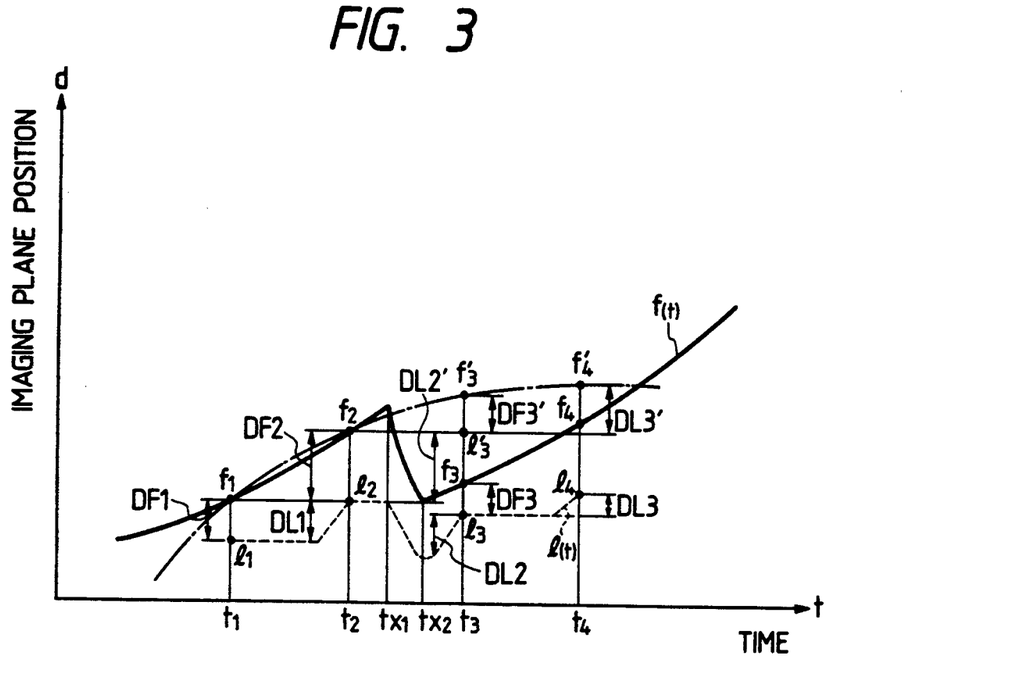
FIG. 3 illustrates a problem peculiar to the focus adjusting method in FIG. 1.

The actual locus f(t) in FIG. 3 of the accompanying drawings shows the change in the imaging plane position when the zoom position moves from the telephoto side to the wide angle side at time $t_{x1}$ to time $t_{x2}$. That is, before time $t_{x1}$, the imaging plane position was as shown in FIG. 1, but from time $t_{x2}$ on, it shifts to the imaging plane position shown in FIG. 2. At the same time, the imaging plane position l(t) of the lens also changes from time $t_{x1}$ to time $t_{x2}$. Therefore, the lens driving $DL_2$ based on the detected defocus amount $DF_2$ at time $t_2$ is as shown in FIG. 3 and the imaging plane position of the lens is l3.

That is, the detected defocus amount $DF_2$ at time $t_2$ is the defocus amount on the telephoto side and thereafter, the zoom position is set to the wide angle side and therefore, the amount of lens driving in this case is $DL_2$ differing from $DL_2'$ corresponding to said defocus amount $DF_2$ detected on the telephoto side, and the imaging plane position of the line is l3.

On the other hand, as regards the imaging plane position of the lens found by calculation, the imaging plane position of the lens at time $t_2$ is $l_2$, and the defocus amount at time $t_2$ is $DF_2$ and the amount of lens driving corresponding to the then $DF_2$ (telephoto side) is $DL_2'$ and therefore, the calculation of $l_2 + DL_2' + l_3'$ is effected.

Also, assuming that the defocus amount detected at time $t_3$ is $DF_3$, the imaging plane position at time $t_3$ is $f_3 = l_3 + DF_3$, but the imaging plane position based on the imaging plane position $l_3'$ of the lens found by said calculation is $f_3' = l_3' + _{DF_3}'$ ($DF_3 = DF_3'$). Consequently, the imaging plane position $f_4'$ at time $t_4$ found from these calculated data by the correcting calculation differs from the imaging plane position $f_4$ at the actual time $t_4$, and this results in the occurrence of an inconvenience.

SUMMARY OF THE INVENTION

One aspect of the application is the elimination of the above-noted problems and the gist thereof is as follows.

The present invention intends to provide a device which ensures proper correction lens driving to be accomplished even when zooming is effected. One aspect of the application is that the defocus amount used in the calculation of the above-described correcting method is substituted for by an amount of movement of the lens not varied by zooming, thereby ensuring proper correction lens driving is accomplished even when zooming is effected.

More particularly, auto focus adjustment is accomplished by finding the amount of movement of the focus adjusting optical system of the photo-taking lens from the detected defocus amount If the focal length of the photo-taking lens varies, when the distance to the object to be photographed is the same, the defocus amount varies, but said amount of movement does not vary. Therefore, in the auto focus adjusting device of a camera, a "coefficient representative of the ratio of the amount of movement of the imaging plane position to the amount of movement of the focus adjusting optical system" at each zoom position is usually input from the lens and this coefficient is multiplied by the defocus amount, thereby finding an amount of movement of the lens which does not depend on the focal length.

In the present invention, calculation is effected with the defocus amount in the aforementioned correcting calculation equations (9), (10) and (11) substituted for by the amount of movement of the lens.

When the latest detected defocus amount is DEF and the lens coefficient is S, $$DF_n = DEF \cdot s \qquad (12).$$

If after the substitution of the above equation (12), correcting calculations in the recurrence formula which are equations (9), (10) and (11) are effected, there is obtained a corrected amount of movement $DL_n$ of the lens.

Consequently, the present invention provides a device which ensures proper lens driving to be accomplished by the substitution calculation processing of the aforementioned equation (12).

Other objects of the present invention will become more fully apparent from the following detailed description of an embodiment thereof taken in conjunction with the accompanying drawings.

DESCRIPTION OF THE PREFERRED EMBODIMENT

An embodiment of the present invention will hereinafter be described with reference to FIGS. 4 and so on.

Figure 4:
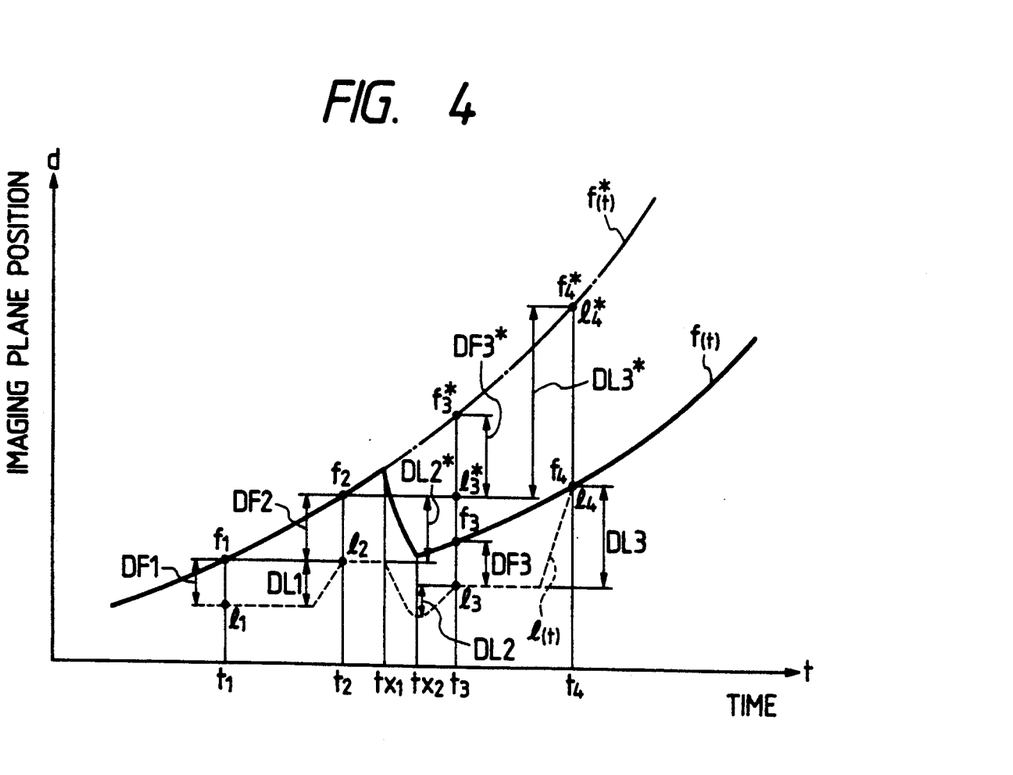
FIG. 4 illustrates the focus adjusting method of the present invention.

The condition of FIG. 4 is the same as that of FIG. 3. In FIG. 4, on the telephoto side before time $t_{x1}$, said lens coefficient is $s=1$, and on the wide angle side at and after time $t_{x2}$, the lens coefficient is $s=2$. Accordingly, before time $t_{x1}$, the actual imaging plane position and the value thereof converted into the amount of lens movement are on the same locus.

When zooming is effected from time $t_{x1}$ to time $t_{x2}$, the imaging plane position of the object to be photographed changes as indicated by f(t) in FIG. 4. At the same time, the imaging plane position l(t) of the lens also changes from time $t_{x1}$ to $t_{x2}$ under the influence of zooming. Therefore, the lens drive $DL_2$ based on the detected defocus amount $DF_2$ at time $t_2$ is as shown in FIG. 4, and the actual imaging plane position of the lens becomes l3.

In the present invention, however, control is effected by the defocus amount multiplied by the lens coefficient, i.e., the amount of lens movement, and therefore, independently of zooming, the drive is $DL_2^*$ and the imaging plane position of the lens is regarded as being at l3*.

Next, at time $t_3$, the actual imaging plane position of the object to be photographed is at f3, and the then detected defocus is $DF_3$, but by multiplying it by the lens coefficient s in accordance with equation (12) to thereby find $DF_3^*$, the imaging plane position of the object to be photographed at time $t_3$ can be regarded as $f_3^*$, in spite of zooming having been effected Thereafter, by effecting the correcting calculation of equations (9), (10) and (11), the imaging plane position $f_4^*$ of the object to be photographed at time $t_4$ is extrapolated as indicated by the dot-and-dash line in FIG. 4. Lens driving is effected with the amount of lens drive $DL_3^*$ found so that this $f_4^*$ and the imaging plane position $l_4^*$ of the lens coincide with each other, and $DL_3^*$ is an amount converted into the amount of movement of the lens, and the amount obtained by converting the actual amount of lens drive into the imaging plane position is $DL_3$.

As a result, it becomes possible to make the imaging plane position $f_4$ of the object to be photographed substantially coincident with the imaging plane position l4 of the lens at time $t_4$.

That is, in the present invention, even if zooming is effected, the amount of lens drive $DL_3^*$ for making the imaging plane position of the lens coincident with $f_4^*$ is found from the imaging plane position $f_4^*$ of the object to be photographed foreseen at time $t_4$ and the imaging plane position $l_3^*$ of the lens predetermined before zooming, on the basis of the data before zooming is effected, and it is converted into the amount of lens drive $DL_3$ when zooming has been effected, and from the actual imaging plane position l3 of the lens at time $t_3$, the lens is driven by said $DL_3$ and the foreseen imaging plane position $f_4$ after zooming has been effected is made coincident with the imaging plane position l4 of the lens.

Figure 5:
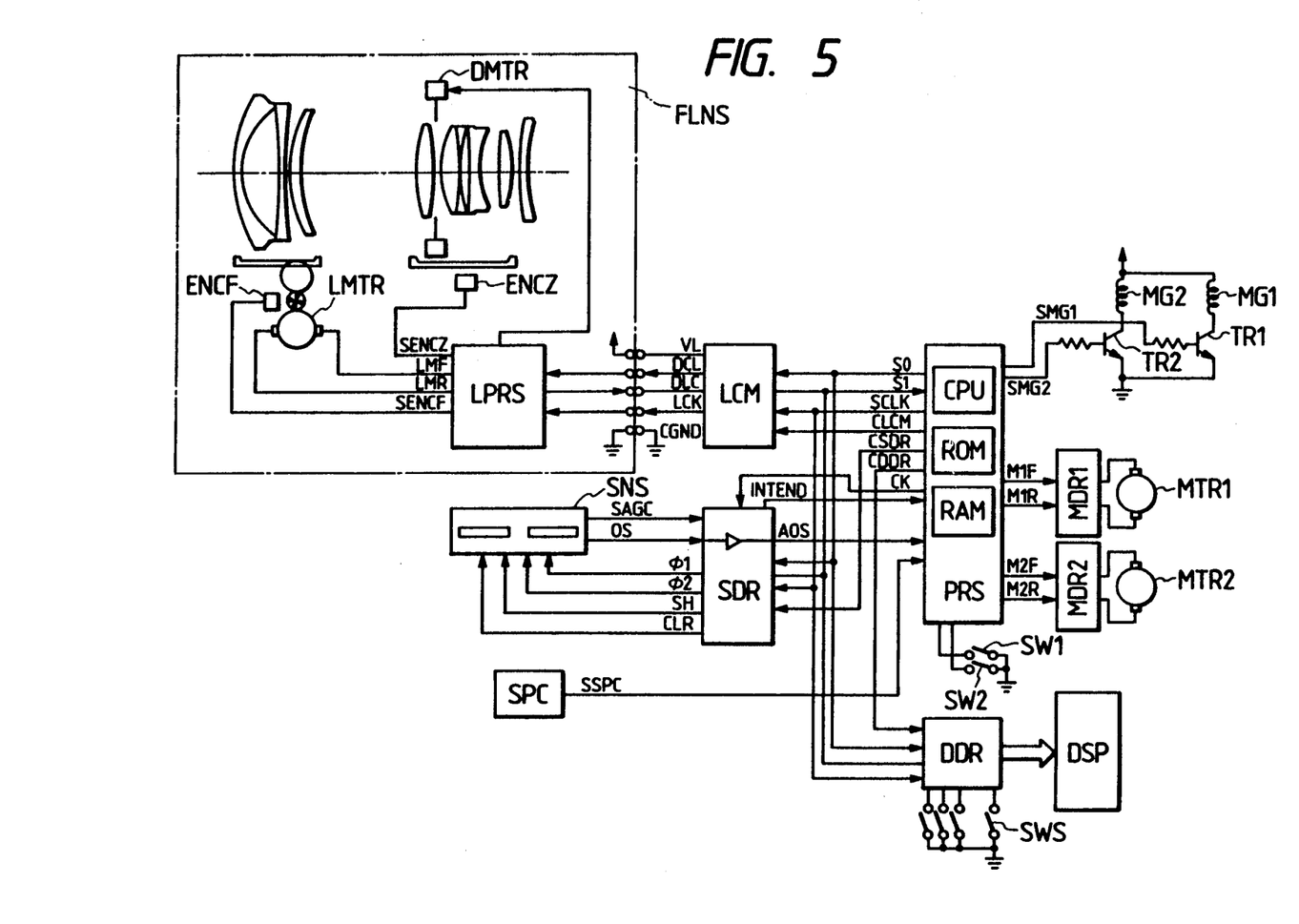
FIG. 5 is a circuit diagram of a camera which is an embodiment of the present invention, and a lens.

FIG. 5 is a circuit diagram showing an embodiment of a camera provided with the auto focus adjusting device according to the present invention.

In FIG. 5, PRS designates the control device of the camera. The control device PRS is, for example, a 1-chip microcomputer having a CPU (central processing unit), a ROM, a RAM and the A/D-converting function therein. The computer PRS effects a series of operations of the camera such as the automatic exposure controlling function, the automatic focus adjusting function, and the winding-up and rewinding of film. For that reason, the computer PRS uses communication signals SO, SI and SCLK and communication selecting signals CLCM, CSDR and CDDR to effect communications with its surrounding circuits in the camera body and the control device in the lens and control to the operations of each circuit and the lens.

SO is a data signal output from the computer PRS, SI is a data signal input to the computer PRS, and SCLK is the synchronizing clock of the signals SO and SI.

LCM denotes a lens communication buffer circuit which supplies electric power to a power source terminal VL for the lens during the operation of the camera and which provides the communication buffer between the camera and the lens when the selecting signal CLCM from the computer PRS is at a high potential level (hereinafter referred to as "H", and a low potential level will hereinafter be referred to as "L").

When the computer PRS renders CLCM into "H" and supplies predetermined data from SO in synchronism with SCLK, the buffer circuit LCM outputs the buffer signals LCK and DCL of SCLK and SO, respectively, to the lens through the communication contact between the camera and the lens. Simultaneously therewith, the buffer circuit LCM outputs the buffer signal of the signal DLC from the lens, and the computer PRS inputs the data of the lens from SI in synchronism with SCLK.

SDR designates the driving circuit of a line sensor device SNS for focus detection comprised of a CCD or the like. When the signal CSDR is "H", the driving circuit SDR is selected and is controlled from the computer PRS by the use of SO, SI and SCLK. Signal CK is a clock for producing CCD driving clocks $\Phi 1$ and $\Phi 2$, and signal INTEND is a signal for informing the computer PRS of the termination of the accumulating operation.

The output signal OS of the sensor device SNS is a time serial image signal synchronized with the clock $\Phi 1$ and $\Phi 2$, and is output as AOS to the computer PRS after being amplified by an amplifying circuit in the driving circuit SDR. The computer PRS inputs AOS from an analog input terminal, and stores it at the predetermined address of the RAM as a digital signal by the A/D-converting function therein in synchronism with CK.

SAGC which also is the output signal of the sensor device SNS is the output of the AGC (auto gain control) sensor in the sensor device SNS, and is input to SDR for use for the control of the image accumulating time in a light receiving element such as the CCD of the sensor device SNS.

SPC denotes a photometric sensor for exposure control which receives the light from the object to be photographed passed through a photo-taking lens, and the output SSPC thereof is input to the analog input terminal of the computer PRS, is A/D-converted and thereafter, is used for automatic exposure control in accordance with a predetermined program.

DDR designates a switch detecting and displaying circuit which is selected when signal CDDR is "H", and is controlled from the computer PRS by the use of SO, SI and SCLK. That is, it changes over the display of the display member DSP of the camera on the basis of the data supplied from the computer PRS, and informs the computer PRS of the ON-OFF states of the various operating members of the camera.

SW1 and SW2 denote switches operatively associated with a release button, not shown. The switch SW1 is closed by the depression of the release button in the first stage, and subsequently the switch SW2 is closed by the depression of the release button in the second stage. The computer PRS effects photometry and auto focus adjustment upon closing of the switch SW1, and effects exposure control and winding-up of film with the closing of the switch SW2 as a trigger.

The switch SW2 is connected to the "interrupt input terminal" of the microcomputer PRS, and interruption is exerted by the closing of the switch SW2 when the program is being executed during the closing of the switch SW1, and immediately the control can be shifted to a predetermined interrupt program.

MTR1 designates a film feeding motor, and MTR2 denotes a mirror up-down and shutter spring charging motor. The forward and reverse rotations of these motors are controlled by their respective driving circuits MDR1 and MDR2. Signals M1F, M1R, M2F and M2R input from the computer PRS to the driving circuits MDR1 and MDR2 are motor controlling signals.

MG1 and MG2 denote magnets for starting the movement of the forward and rearward shutter curtains These magnets are supplied with electric power by signals SMG1 and SMG2 and amplifying transistors TR1 and TR2, and shutter control is effected by the computer PRS.

The switch detecting and displaying circuit DDR, the motor driving circuits MDR1 and MDR2 and shutter control bear no direct relation to the present invention and therefore need not be described in detail.

Signal DCL input to a control circuit LPRS in the lens in synchronism with LCK is command data from the camera to the lens FLNS, and the movement of the lens in response to the command is predetermined. The control circuit LPRS analyzes the command thereof in accordance with a predetermined procedure, and effects focus adjustment, aperture control operation and outputting of the operating situations of the various portions of the lens (such as the driving situation of a focus adjusting optical system and the driven state of the diaphragm) and various parameters (such as the open F-number, the focal length, and the coefficient of the defocus amount vs. the amount of movement of the focus adjusting optical system) from an output DLC.

In the embodiment, there is shown an example of a zoom lens, and when a focus adjustment command is sent from the camera, a focus adjusting motor LTMR is driven by signals LMF and LMR in accordance with the amount and direction of driving sent at the same time, whereby the optical system is moved in the direction of the optic axis to thereby accomplish focus adjustment. The amount of movement of the optical system is monitored by the pulse signal SENCF of an encoder circuit ENCF which outputs the pulse signal SENCF in response to the movement of the optical system, and is counted by a counter in the control circuit LPRS, and at a point of time whereat a predetermined amount of movement has been completed, the control circuit LPRS itself renders signals LMF and LMR into "L" and controls the motor LTMR.

Therefore, once the focus adjustment command is sent from the camera, the control device PRS of the camera need not be concerned at all in lens driving until the driving of the lens is completed. Also, design is made such that when there is a requirement from the camera, it is possible to supply the content of said counter to the camera.

When an aperture control command is sent from the camera, a conventional stepping motor DMTR is driven for aperture driving in accordance with the number of aperture steps sent at the same time. The stepping motor can be open-controlled and therefore does not require an encoder for monitoring the operation thereof.

ENCZ designates an encoder circuit which is attendant to a zoom optical system and outputs a signal SENCZ corresponding to the zoom state, and the control circuit LPRS receives as an input the signal SENCZ from the encoder circuit ENCZ and detects the zoom positions. Lens parameters in the respective zoom positions are stored in the control circuit LPRS, and this control circuit supplies to the camera a parameter corresponding to the current zoom position when there is a requirement from the computer PRS of the camera.

The operation of the camera having the abovedescribed construction will hereinafter be described with reference to the flow charts of FIGS. 6 and so on.

When a power source switch, not shown, is closed, the supply of electric power to the microcomputer PRS is started and the computer PRS starts to execute the sequence program stored in the ROM.

Figure 6:
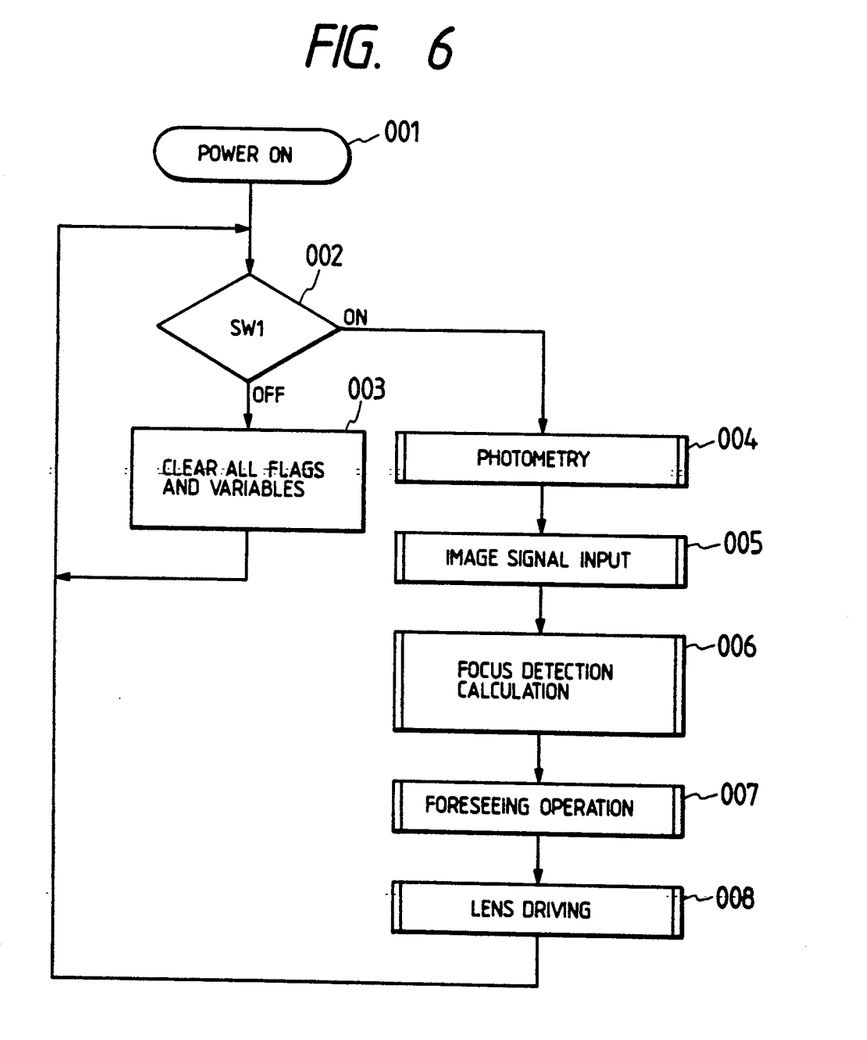
FIG. 6, 7a and 7b and 8 are control flow charts of the present invention.

FIG. 6 is a flow chart showing the flow of the whole of said program. When the execution of the program is started by the above-described operation, detection of the state of the switch SW1 adapted (to be closed by the first stage depression of the release button) is effected at step (002) via step (001), and when the switch SW1 is OFF, shift is made to step (003), where all control flags and variables set in the RAM in the computer PRS are cleared for intialization.

The steps (002) and (003) are repetitively executed until the switch SW1 becomes ON or until the power source switch becomes OFF. By the switch SW1 becoming ON, shift is made from the step (002) to step (004).

At step (004), a "photometry" sub-routine for exposure control is executed The computer PRS inputs the output SSPC of the photometric sensor SPC shown in FIG. 5 to the analog input terminal and effects A/D conversion, and calculates the optimum shutter control value and aperture control value from the digital photometric value thereof and stores them into the predetermined addresses of the RAM. During the releasing operation, it effects shutter and aperture control on the basis of these values.

Figure 7A:
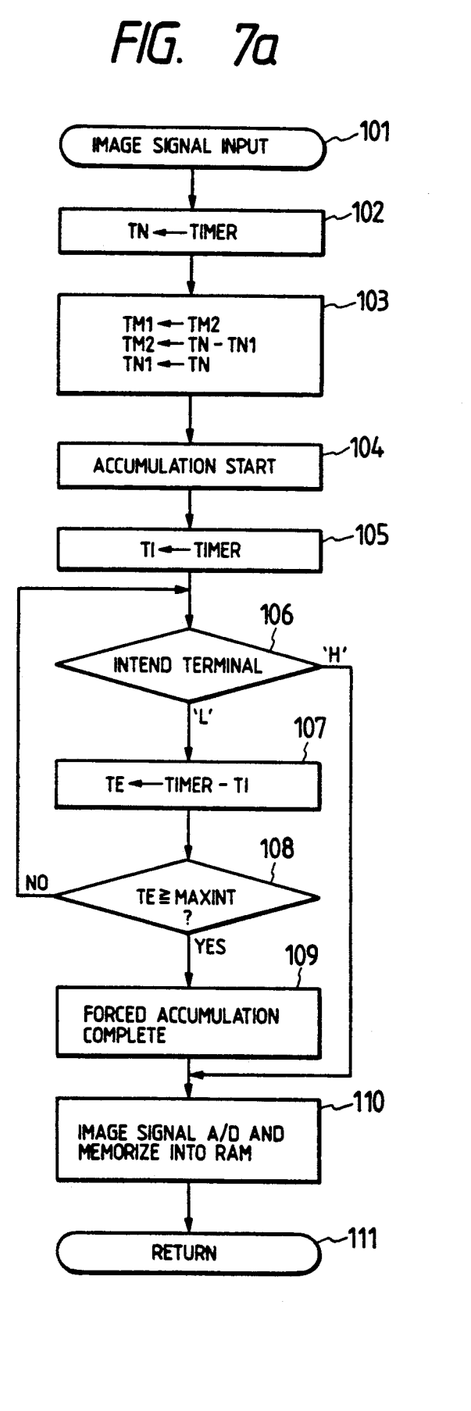

Subsequetnly, at step (005), an "image signal input" sub-routine is executed. The flow of this subroutine is shown in FIG. 7a, and the computer PRS effects the inputting of an image signal from the sensor device SNS for focus detection. The details thereof will be described later.

At the next step (006), a "focus detection" subroutine is executed, and the defocus amount DEF of the phototaking lens is calculated on the basis of the input image signal. The specific method of calculation is disclosed in the assignee's Japanese Patent Application No. 61-160824, etc. and therefore need not be described in detail.

Figure 8:
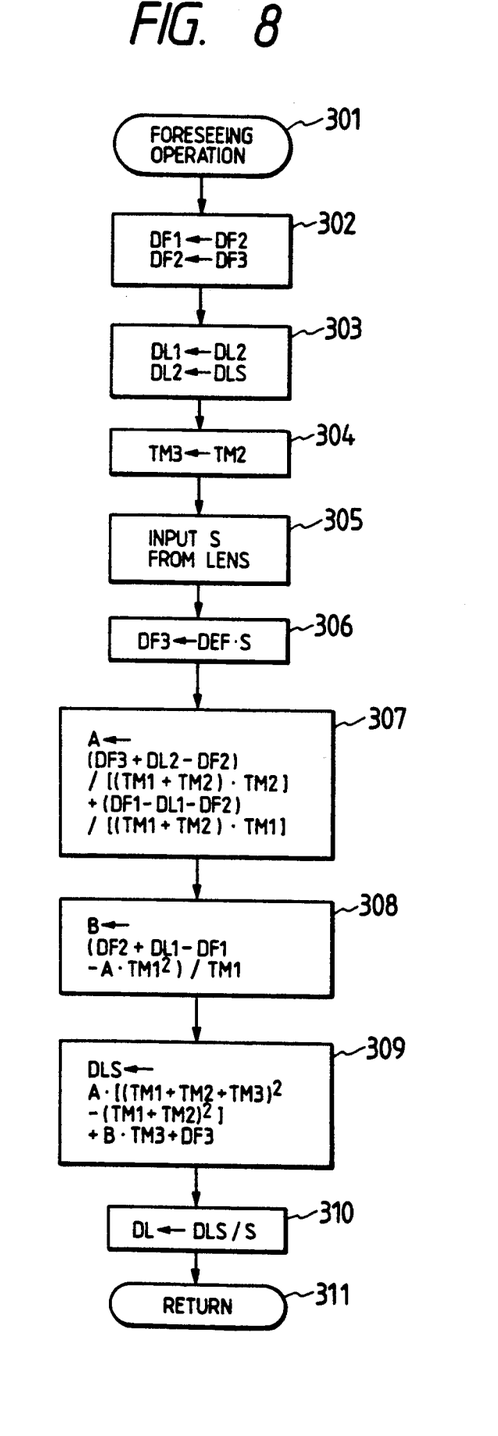

At the next step (007), a "foreseeing calculation" sub-routine is executed. The "foreseeing calculation" sub-routine effects the correction of the amount of lens driving shown in equations (12), (9), (10) and (11), and the flow thereof is shown in FIG. 8.

Figure 7B:
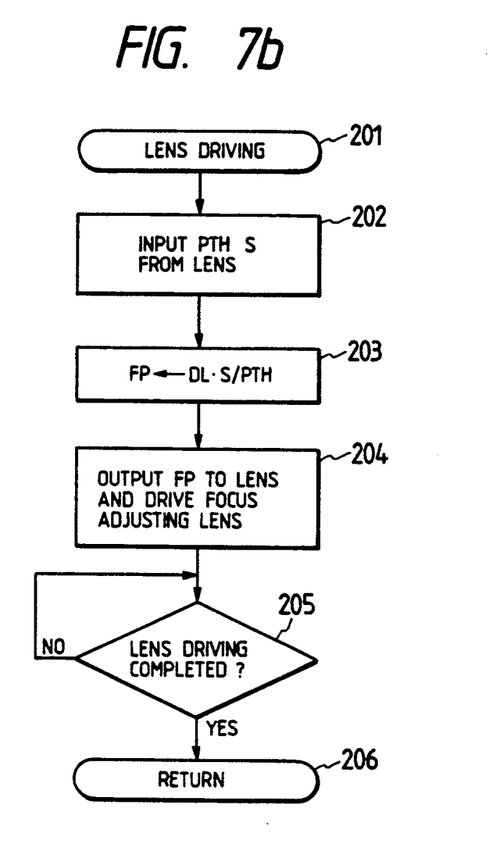

Subsequently, at step (008), a "lens driving" sub-routine is executed, and lens driving is effected on the basis of the defocus amount DL corrected at the previous step (007). The flow of the "lens driving" subroutine is shown in FIG. 7b.

After the completion of lens driving, shift is again made to the step (002), and steps (004) to (008) are repetitively executed until the switch SW1 becomes OFF, and preferable focus adjustment is also effected for a moving object to be photographed.

The switch SW2 (adapted to be closed by the second stage depression of the release button) is connected to the interrupt input terminal of the computer PRS, as previously described, and design is made such that when the switch SW2 is closed, whatever step is being executed, shift is immediately made to the step of the releasing operation by the interrupt function, but the releasing operation bears no direct relation to the present invention and therefore need not be described.

The "image signal input" sub-routine shown in FIG. 7a will now be described.

"The image signal input" is an operation executed at the first stage of the cycle of each focus adjusting operation, and when this sub-routine is called, the timer value TIMER of a self-movement timer in the microcomputer PRS itself is stored into a memory area TN of the RAM at step (102) via step (101), whereby the starting time of the focus adjusting operation is stored At the next step (103), $TM_1$ and $TM_2$ corresponding to the time intervals $TM_{n-2}$ and $TM_{n-1}$ in the equations (9), (10) and (11) for the correction of the amount of lens driving are renewed. Before step (103) is executed, the time intervals $TM_{n-2}$ and $TM_{n-1}$ in the before-last focus adjusting operation and the last focus adjusting operation are stored in $TM_1$ and $TM_2$, respectively, and the time when the last focus adjusting operation has been started is $TN_1$.

Accordingly, when step (103) is executed, $TM_1$ represents the time interval from the before-last to the focus adjusting operation and $TN-TN_1$ represents the time interval from the last to the current focus adjusting operation, and these are stored in the memory areas $TM_1$ and $TM_2$ in the RAM which correspond to $TM_{n-2}$ and $TM_{n-1}$ in equations (9), (10) and (11). In $TN_1$, the current time TN is stored for the next focus adjusting operation.

Now, at the next step (104), accumulation of an optical image is started in the sensor device SNS. Specifically, the microcomputer PRS supplies an "accumulation starting command" to the sensor driving circuit SDR by communication, and in response thereto, the sensor driving circuit SDR renders the clear signal CLR of the photoelectric converting portion of the sensor device SNS into "L" and causes the sensor device to start the accumulation of charges.

At step (105), the timer value of the selfmovement timer is stored as a variable TI and the current time is memorized.

At the next step (106) the state of the input INTEND terminal of the computer PRS is detected and whether the accumulation has been terminated is examined. The sensor driving circuit SDR is of such structure that it renders the signal INTEND into "L" simultaneously with the start of the accumulation, monitors the AGC signal SAGC from the sensor device SNS, and renders the signal INTEND into "H" when the signal SAGC reaches a predetermined level, and at the same time, renders a charge transfer signal SH into "H" for a predetermined time and causes the charges in the photoelectric converting portion to be transferred to the CCD portion.

If at step (106), the INTEND terminal is "H", it means that the accumulation has been terminated, and shift is made to step (110), and if the INTEND terminal is "L", it means that the accumulation is not yet terminated, and shift is made to step (107).

At step (107), the time TI memorized at step (105) is subtracted from the timer value TIMER of the self-movement timer and is stored as a variable TE. Thus, the time from the start of the accumulation till the current time, i.e., the so-called "accumulation time", is stored in TE.

At the next step (108), TE is compared with a constant MAXINT, and if TE is less than MAXINT, return is made to step (106), where the termination of the accumulation is again waited for. When TE becomes greater than MAXINT, shift is made to step (109), where the accumulation is forcibly terminated. The forcible termination of the accumulation is executed by an "accumulation terminating command" being supplied from the computer PRS to the driving circuit SDR.

When the "accumulation terminating command" is supplied from the computer PRS to the driving circuit SDR, the driving circuit SDR renders the charge transfer signal SH into "H" for a predetermined time and causes the accumulated charges in the photoelectric converting portion to be transferred to the CCD portion. The accumulation in the sensor is terminated by the flow up to step (109).

At step (110), the A/D conversion of a signal AOS obtained by amplifying the image signal OS of the sensor device SNS by the sensor driving circuit SDR and the storge of a digital signal obtained from the A/D conversion into the RAM are effected More particularly, the sensor driving circuit SDR produces CCD driving clocks Φ1 and Φ2 in synchronism with the clock CK from the computer PRS and imparts them to a control circuit SSCNT in the sensor device SNS, and the sensor device SNS has its CCD portion driven by the clocks Φ1 and Φ2, and the charges in the CCD are time-serially output as the image signal from the output OS. This signal is amplified by an amplifier in the driving circuit SDR, whereafter it is input as AOS to the analog input terminal of the computer PRS. The computer PRS effects A/D conversion in synchronism with the clock CK output by itself, and the digital image signals after the A/D conversion are successively stored at the predetermined addresses of RAM.

When the inputting of the image signals is terminated in this manner, the "image signal input" sub-routine is returned to the main program at step (111).

The flow chart of the "lens driving" sub-routine is shown in FIG. 7b.

When this sub-routine is executed, communication is effected with the lens at step (202) and two data "S" and "PTH" are input. "S" is the aforementioned "coefficient of the amount of movement of the focus adjusting optical system vs. the amount of movement of the imaging plane" of the photo-taking lens. That is, it represents the amount of movement of the imaging plane of the photo-taking lens when the focus adjusting optical system of the photo-taking lens has been moved by a unit length in the direction of the optic axis. For example, in the case of a single lens of the totally axially moved type, the entire photo-taking lens corresponds to the focus adjusting optical system and thus, the movement of the focus adjusting optical system is driectly the movement of the imaging plane of the photo-taking lens and therefore, S=1, and in the case of a zoom lens, S is varied by the position of the zoom optical system.

"PTH" is the amount of movement of the focus adjusting optical system LNS per pulse of the output of the encoder ENCF operatively associated with the movement of said optical system in the direction of the optic axis.

Thus, the value obtained by converting the amount of movement of the focus adjusting optical system into the output pulse number of the encoder by the defocus amount DL to be focus-adjusted and said S and PTH is given by the following equation:

$FP = DL \cdot S / PTH.$

Step (203) executes the above equation as it is.

At step (204), FP found at step (203) is supplied to the lens and the driving of the focus adjusting optical system is commanded.

At the next step (205), communication is effected with the lens and whether the driving by the amount of lens driving FP commanded at step (204) has been terminated is detected, and when the driving is terminated, shift is made to step (206), where the "lens driving" sub-routine is returned to the main program.

That is, at step (204), said FP is input to a counter in the control circuit LPRS and the motor is driven in a direction indicated by said FP, whereupon a monitor signal SENCF (pulse) from the encoder ENCF is counted, and when the counted value coincides with the FP in said counter, the control circuit LPRS stops the motor LMTR and outputs a lens driving stop signal. At step (205), the computer PRS detects this stop signal by said communication and returns it to the main program.

The flow of the "foreseeing calculation" subroutine will now be described with reference to FIG. 8.

At steps (302) and (303), renewal of data is effected for the current correction calculation. That is, equations (9), (10) and (11) are represented in the form of recurrence formulae, and at a point of time whereat the correction calculation is executed, use is made of the data at a plurality of times in the past from said point of time. At step (302), the data obtained by converting the detected defocus amount into the amount of movement of the lens is renewed, and at step (303), the data obtained by converting the corrected defocus amount to be lens-driven into the amount of movement of the lens is renewed.

That is, at step (302), renewal of data is effected to make $DF_1$ and $DF_2$ of FIG. 4 always the defocus data at the latest two times in the past, and at step (303), renewal of data is effected to make $DL_1$ and $DL_2$ of FIG. 4 always the data at the latest two times in the past. DLS is input as $DL_2$, and this DLS is data representative of the amount of movement of the lens at the last time found at step (309) to be described, and in the case of FIG. 4, it corresponds to $DL_2^*$.

At the next step (304), the value of $TM_2$ is stored as $TM_3$ corresponding to the time interval $TM_n$ from the current focus adjusting operation to the next focus adjusting operation. That is, as described in the description of equation (11), the time interval $TM_2$ from the last focus adjusting operation to the current focus adjusting operation is assumed as the time interval $TM_3$ from the current focus adjusting operation to the next focus adjusting operation.

At step (305), a lens coefficient "S" is input from the lens, and at the next step (306), the conversion of the defocus amount into the amount of movement of the lens which is represented by equation (12) is effected. Since equations (9), (10) and (11) are in the form of recurrence formulae, the conversion of all defocus amounts into the amount of movement of the lens is achieved by effecting the operation of equation (12) on the current detected defocus amount DEF.

That is, at step (306), the defocus amount DEF at each time is calculated with the then coefficient S to obtain $DEF \cdot S = DF$, whereby the detected defocus amount is converted into the amount of movement of the lens.

Consequently, even if as shown, for example, in FIG. 4, the detected defocus amounts $DF_1$ and $DF_2$ at times $t_1$ and $t_2$ are obtained in the state of the telephoto side and at time $t_3$, the zoom state shifts to the wide angle side, the detected defocus amount $DF_3$ at time $t_3$ is converted into $DF_3^*$, i.e., a value in accord with the defocus amount on the telephoto side, by said operation. Also, the data $DEF \cdot S$ at this step (306) is input as $DF_3$, and at said step (302), $DF_3$ is substituted into $DF_2$, which in turn is substituted into $DF_1$, and therefore, $DF_1$, $DF_2$ and $DF_3$ during this foreseeing calculation are all processed as values of the same standard, and in the aforementioned case, values of the telephoto side standard, even if the zoom ratio is varied.

The calculations shown in the subsequent steps (307), (308) and (309) are also effected in conformity with said converted $DF_1$, $DF_2$ and $DF_3$ and therefore DLS is likewise made into a signal representative of the amount of movement of the lens coincident with said standard, and at the step 303, this DLS is substituted into $DL_2$, which in turn is substituted into $DL_1$ and thus, these $DL_1$ and $DL_2$ also represent the amount of movement of the lens coincident with said standard even if the zoom ratio is changed.

Accordingly, even if the zoom ratio is changed as shown in FIG. 4, said data $DF_1$, $DF_2$, $DF_3$ (DLS), $DL_1$ and $DL_2$ are all data converted on the same standard (the telephoto side), and $DF_3$ and $DL_2$ are found as $DF_3{}^*$ and $DL_2{}^*$, respectively.

The next step (307) executes equation (9), the next step (308) executes equation (10) and the next step (309) executes equation (11), and the value DLS of the defocus amount to be lens-driven as it is converted into the amount of movement of the lens is obtained.

This DLS, as described above, is a value found on the basis of $DL_1$, $DL_2{}^*$, $DF_1$, $DF_2$ and $DF_3{}^*$ shown in FIG. 4, and corresponds to $DL_3{}^*$.

At the next step (310), the calculation of DL=DLS/S is effected, and said $DL_3{}^*$ is returned to the defocus amount in the zoom state at that point of time. That is DLS is a value of the telephoto side standard in FIG. 4 and actually the zoom state is set to the wide angle side and therefore, by said calculation, $DL_3{}^*$ is converted into the defocus amount on the wide angle side, i.e., DL of FIG. 4, whereafter at step (311), the "foreseeing calculation" sub-routine is returned to the main program.

As regards DL=$DL_3$ found in this manner, as shown in FIG. 6, lens driving conforming to said defocus $DL_3$ is effected in the aforementioned "lens driving" sub-routine after the "foreseeing calculation" subroutine and the imaging plane position of the lens comes into coincidence with the imaging plane position of the image.

In the embodiment described above, the change in the imaging plane position attributable to the movement of the object to be photographed is approximated by a quadratic function, but it is apparent that the present invention is not restricted to a quadratic function, but is also applicable to a linear function or a higher order function or further, other appropriate functions.

We claim:

1. Apparatus for use with an auto focus adjusting device which is provided with a focus state detecting circuit for detecting a focusing state of an imaging optical system and a driving circuit for driving the imaging optical system n conformity with a result of the detection by said detecting circuit, comprising:
   (a) a calculation circuit for performing a first calculation in which imaging plane positions at a plurality of points of time in the past and at the present time are determined on the basis of a signal representing a focusing state in the past detected by said focus state detecting circuit and a signal representing a focusing state at the latest time to determine coefficients of a predetermined higher order function, and for performing a second calculation in which an imaging plane position at a time after a predetermined time has passed is determined on the basis of the higher order function;
   (b) a regulation circuit for regulating the signal representing the focusing state detected by said focus detecting circuit, and for causing the operation of said calculation circuit to be performed on the basis of said regulated signal; and
   (c) a control circuit for transmitting the signal representing the imaging plane position obtained by said calculation circuit to said driving circuit for driving said imaging optical system.

2. Apparatus according to claim 1, wherein the signal representing the focus state detected by said focus detecting circuit is a signal representing a defocus amount.

3. Apparatus according to claim 2, wherein said regulation circuit regulates the defocus amount by converting the signal representing the defocus amount into a lens driving amount.

4. Apparatus according to claim 3, wherein said higher order function is a second order function represented by:

$$f(t) = at^2 + bt + c$$

where,
   f(t): imaging plane position; and
   a, b, and c are the coefficients determined by said calculation circuit.

5. Apparatus for use with an auto focus adjusting device which is provided with a focus state detecting circuit for detecting a focusing state of an imaging optical system and a driving circuit for driving the imaging optical system in conformity with a result of the detection by said detecting circuit, comprising:
   (a) a calculation circuit for determining image plane positions at a plurality of points of time in the past and at the present time on the basis of a signal representing the focusing state detected by said focus state detecting circuit, for determining coefficients of a higher order function on the basis of a relation between the imaging plane positions at said plurality of points of time, and for calculating an imaging plane position at a time after a predetermined time has passed on the basis of said coefficients and said higher order function;
   (b) a regulation circuit for regulating the signal representing the focusing state detected by said focus detecting circuit, and for causing the operation of said circuit calculation to be performed on the basis of said regulated signal; and
   (c) a control circuit for transmitting the signal representing the imaging plane position obtained by said calculation circuit to said driving circuit for driving said imaging optical system.

* * * * *

UNITED STATES PATENT AND TRADEMARK OFFICE
CERTIFICATE OF CORRECTION

PATENT NO. : 5,005,037

DATED : April 2, 1991

INVENTOR(S) : Akashi, et al.

It is certified that error appears in the above-identified patent and that said Letters Patent is hereby corrected as shown below:

COLUMN 2

Line 32, "$(T_2,f_2)$" should read --$(t_2,f_2)$--; and
Line 35, "is" should read --are--.

COLUMN 3

Line 33, "$DF_n$" (first occurrence) should read --$DF_{n-1}$--;
Line 57, "necessary" should read --necessary.--; and
Line 61, "itself" should read --itself.--.

COLUMN 4

Line 41, "$f_3'=1_3. + pF3'$ $(DF_3=DF_3')$." should read --$f_3'=1_3' + DF_3'$ $(DF_3=DF_3')$.--.

COLUMN 6

Line 3, "effected" should read --effected.--; and
Line 48, "control to" should read --to control--.

COLUMN 9

Line 4, "adapted (to" should read --(adapted to--;
Line 25, "Subsequetnly," should read --Subsequently,--; and
Line 68, "into" should read --in--.

COLUMN 10

Line 30, "Selfmovement" should read --self-movement--.

UNITED STATES PATENT AND TRADEMARK OFFICE
CERTIFICATE OF CORRECTION

PATENT NO. : 5,005,037
DATED : April 2, 1991
INVENTOR(S) : Akashi, et al.

It is certified that error appears in the above-identified patent and that said Letters Patent is hereby corrected as shown below:

COLUMN 11

Line 24, "RAM." should read --the RAM.--; and
Line 43, "driectly" should read --directly--.

COLUMN 13

Line 5, "converted $DF_1$, $DF_2$ and $DF_3$" should read --converted data $DF_1$, $DF_2$ and $DF_3$--; and
Line 40, "comes" should read --come--.

Signed and Sealed this

First Day of December, 1992

Attest:

DOUGLAS B. COMER

*Attesting Officer*     *Acting Commissioner of Patents and Trademarks*